United States Patent
Kim et al.

(10) Patent No.: US 7,838,093 B2
(45) Date of Patent: Nov. 23, 2010

(54) MULTIFUNCTIONAL OPTICAL FILM, AND SURFACE LIGHT SOURCE DEVICE AND LIQUID CRYSTAL DISPLAY EMPLOYING THE OPTICAL FILM

(75) Inventors: Sang Gun Kim, Gimpo (KR); Eung Chan Lee, Gumpo (KR); Seung Sang Hwang, Seoul (KR); Jae Hwan Shin, Seoul (KR)

(73) Assignee: Optix Co., Ltd., Gimpo, Gyeonggi-do (KR)

( * ) Notice: Subject to any disclaimer, the term of this patent is extended or adjusted under 35 U.S.C. 154(b) by 982 days.

(21) Appl. No.: 11/654,365

(22) Filed: Jan. 16, 2007

(65) Prior Publication Data

US 2008/0165542 A1 Jul. 10, 2008

(30) Foreign Application Priority Data

Jan. 9, 2007 (KR) ............ 10-2007-0002668

(51) Int. Cl.
*F21V 5/00* (2006.01)
*G02F 1/1335* (2006.01)

(52) U.S. Cl. .............. 428/1.32; 349/64; 349/112; 528/33

(58) Field of Classification Search ........ 428/1.32; 349/64, 112; 528/12, 31–33, 43
See application file for complete search history.

(56) References Cited

U.S. PATENT DOCUMENTS

| 2,689,804 | A | * | 9/1954 | Sadowsky | 427/64 |
| 6,556,347 | B1 | * | 4/2003 | Murayama et al. | 359/453 |
| 6,787,625 | B2 | | 9/2004 | Lee | |
| 2003/0207082 | A1 | * | 11/2003 | Maas et al. | 428/141 |
| 2007/0213452 | A1 | * | 9/2007 | Kawato et al. | 524/502 |

FOREIGN PATENT DOCUMENTS

| CN | 1162461 C | 8/2004 |
| JP | 04-275501 | 10/1992 |
| JP | 06-059108 | 3/1994 |
| JP | 06-123802 | 5/1994 |
| JP | 09-311205 | 12/1997 |
| JP | 11-246704 | 9/1999 |
| KR | 2003-0029647 | 4/2003 |
| WO | WO 01/60880 A2 | 8/2001 |
| WO | WO 01/60881 A2 | 8/2001 |
| WO | WO 02/099474 A1 | 12/2002 |

* cited by examiner

*Primary Examiner*—Sophie Hon
(74) *Attorney, Agent, or Firm*—Nixon Peabody LLP (57) ABSTRACT

Provided are a multifunctional optical film having light transmission, light diffusion, heat resistance, UV-shielding properties, etc., due to the use of optical silicone resin(s), and showing improved production efficiency based on physical properties (e.g., release property, smoothness) of the silicone resin(s), and a surface light source device and a liquid crystal display employing the optical film.

9 Claims, 8 Drawing Sheets

MULTIFUNCTIONAL OPTICAL FILM, AND SURFACE LIGHT SOURCE DEVICE AND LIQUID CRYSTAL DISPLAY EMPLOYING THE OPTICAL FILM

CROSS-REFERENCE TO RELATED PATENT APPLICATION

This application claims priority from Korean Patent Application No. 10-2007-0002668, filed on Jan. 9, 2007, in the Korean Intellectual Property Office, the disclosure of which is incorporated herein in its entirety by reference.

BACKGROUND OF THE INVENTION

1. Field of the Invention

The present invention relates to a multifunctional optical film, and a surface light source device and a liquid crystal display employing the optical film. More particularly, the present invention relates to a multifunctional optical film having light transmission, light diffusion, heat resistance, UV-shielding properties, etc., due to the use of optical silicone resin(s), and showing improved production efficiency based on physical properties (e.g., release property, smoothness) of the silicone resin(s), and a surface light source device and a liquid crystal display employing the optical film.

2. Description of the Related Art

Recently, plasma display panels (PDPs), field emission displays (FEDs), thin film transistor-liquid crystal displays (TFT-LCDs) etc. have been developed as flat panel displays used in notebook computers, televisions, mobile phones, etc. requiring thinness, compactness, and low power consumption. Among them, LCDs with good color reproducibility and thin thickness have been the most actively studied.

Figure 1:
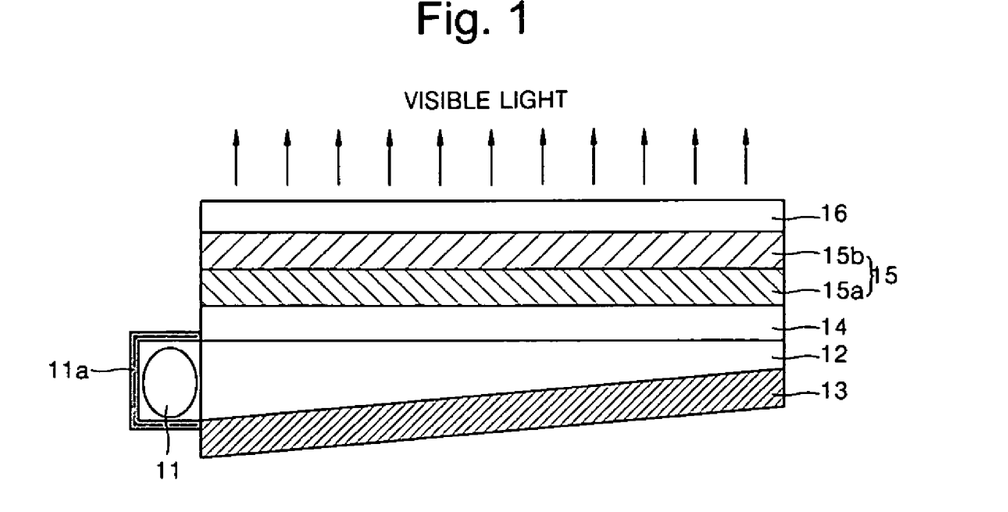
FIG. 1 is a view illustrating a conventional liquid crystal display including an edge-type backlight unit.
Figure 2:
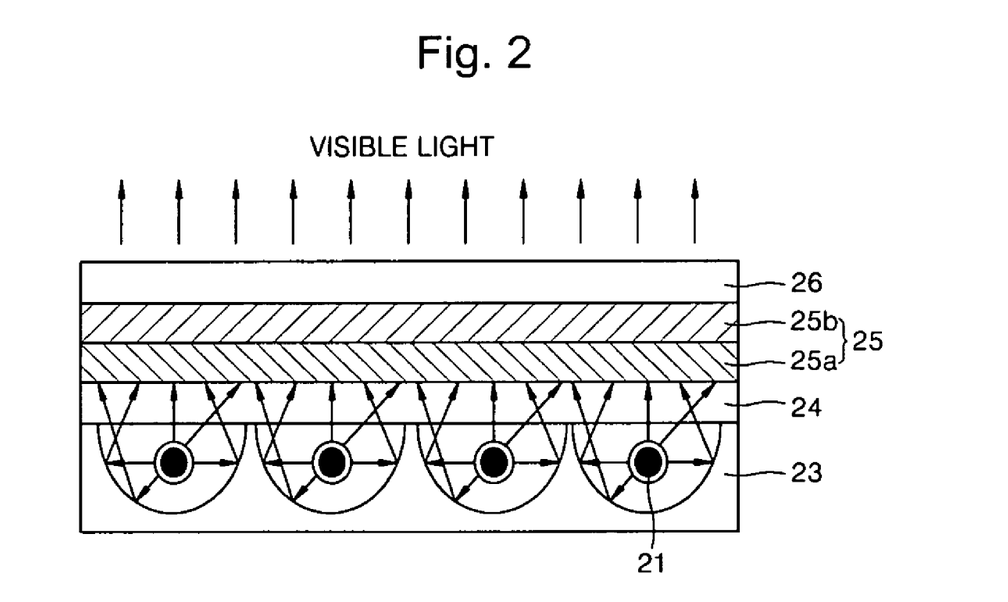
FIG. 2 is a view illustrating a conventional liquid crystal display including a direct-type backlight unit.

Unlike PDPs and FEDs which are self-emissive displays, LCDs are not self-emissive, and thus, use a backlight which is an auxiliary light source illuminating a rear side of an LCD panel to achieve displays. In order to illuminate an LCD panel, and further, to uniformly illuminate the entire of the LCD panel, a backlight has a surface light source structure called as an edge-type as illustrated in FIG. 1 or as a direct-type as illustrated in FIG. 2. FIG. 1 schematically illustrates a conventional LCD including an edge-type light source. Referring to FIG. 1, an LCD includes a light source 11, a light guide plate 12 guiding light emitted from the light source 11, a reflective plate 13 disposed on a lower surface of the light guide plate 12, a diffusing sheet 14 disposed on an upper surface of the light guide plate 12, a prism sheet 15 horizontally or vertically disposed on an upper surface of the diffusing sheet 14, and a protective sheet 16 disposed on an upper surface of the prism sheet 15. The light source 11 is covered with a light source cover 11a. FIG. 2 schematically illustrates a conventional LCD including a direct-type light source. Referring to FIG. 2, an LCD includes a plurality of light sources 21 disposed to be spaced apart from each other by a predetermined distance, a reflective plate 23 disposed below the light sources 21, a protective plate (not shown) disposed on a lower surface of the reflective plate 23, a diffusing sheet 24 disposed on an upper surface of the light sources 21, a prism sheet 25 disposed on an upper surface of the diffusing sheet 24, and a protective sheet 26.

In particular, as a recent trend for TFT-LCDs is toward increasing the sizes of the TFT-LCDs, there arise problems such as a reduction in contrast which is one of the most major disadvantages, accelerated aging of a film by over-exposure to UV, or a reduction in brightness due to a curl phenomenon.

As examples of light-diffusing films used hitherto, there are (1) a diffusing sheet obtained by forming a transparent thermoplastic resin in the form of a sheet and physically forming a concavo-convex pattern on a surface of the sheet (see Japanese Patent Laid-Open Publication No. Hei. 4-275501), (2) a light-diffusing film obtained by coating a light-diffusing layer formed of a transparent resin containing fine particles on a transparent substrate film formed of a polyester resin (see Japanese Patent Laid-Open Publication No. Hei. 6-59108), (3) a light-diffusing sheet obtained by melt-blending of beads with a transparent resin and extruding the molten blend (see Japanese Patent Laid-Open Publication No. Hei. 6-123802), and (4) a light-diffusing sheet (a light-diffusing film) having an islands-in-sea structure obtained by melt-mixing of two or more transparent thermoplastic resins (see Japanese Patent Laid-Open Publication No. Hei. 9-311205).

The light-diffusing films of (1) and (2) are so-called surface light-diffusing films showing a light-diffusing effect by means of a concavo-convex surface pattern or a coated light-diffusing layer. On the other hand, the light-diffusing films of (3) and (4) are light-diffusing films containing light-diffusing components at least inside the substrates.

Of these, the light-diffusing film of (2) obtained by coating a light-diffusing layer on a transparent substrate film has been currently widely used. Generally, a biaxially-drawn polyethyleneterephthalate (PET) film is mainly used as a transparent substrate film. The biaxially-drawn PET film is well known to have good mechanical strength, heat resistance, transparency, and smoothness. When such a PET film is used as a substrate film, an optical film including the substrate film also has the properties of the PET film.

In addition, high performance, high efficiency, thinness, lightness, etc. have been required in the field of constitutional members of LCDs. In order to satisfy the requirements, for example, multi-functionality by surface processing, stacking of films, etc. have been considered. However, the light-diffusing films of (1) and (2) above have considerable surface irregularities, are difficult to be stacked one onto another, together with other films, and cannot be actually surface-processed. With respect to the light-diffusing films of (3) and (4), a diffusion effect is essentially obtained by diffusing components contained in the films. The light-diffusing films of (3) and (4) have a smoother surface than those of (1) and (2), but the smoothness of the light-diffusing films of (3) and (4) cannot be said to be sufficient due to surface irregularities by beads or a thermoplastic resin constituting an islands-in-sea structure in the vicinity of a surface layer. Moreover, when crosslinkable organic microparticles or inorganic microparticles, e.g., beads are melt-blended, like the light-diffusing film of (3), there may occur clogging of filters which are inserted into an extruder in order to remove impurities according to the shape or size of the microparticles, and fluidity of a resin composition may worsen at the time of melting, according to the addition amount of the microparticles, such that film formation is impossible. In particular, films containing therein considerable amounts of diffusing components (beads, etc.), like the light-diffusing films of (3) and (4), include no support, and thus, there is a tendency for strength, in particular flexural strength, to be low. For example, creases may be readily introduced, thereby causing a whitening phenomenon, or creasing or splitting may occur at the edges ate the time of cutting. Moreover, when installed in backlight units, etc., the light-diffusing films of (3) and (4) may be degraded due to temperature elevation of constitutional member(s) by long-time illumination of backlights. As such, when the light-diffusing films of (3) and (4) are installed in backlight units and used for a long time, film distortion may occur, thereby resulting in brightness variation of backlights.

A light-focusing film includes a substrate and a resin film that are different in refractive index in order to enhance directionality of light, and focuses incident light by fine patterns at a surface of the resin film. The fine patterns significantly affect a viewing angle, haziness, light-focusing efficiency, etc. according to the shape, size, arrangement, etc. of the fine patterns, and thus, the shape, size, arrangement, etc. of the fine patterns are important factors that must be considered next to a refractive index difference between a substrate and a photo-curable resin. The absolute value of a refractive index difference between a substrate and a photo-curable resin may be 0.001 or more, more preferably 0.005 to 1, and most preferably 0.1 or more. Light directionality, scattering, diffusion, and focusing properties are also significantly affected by a film material and thickness of a substrate, a volumetric fraction of fine patterns and a film thickness of a photo-curable resin. In particular, front brightness can be maximized by reducing a light absorption (light loss) value of a coating material. That is, brightness, haziness, and a viewing angle can be precisely controlled by appropriately selecting the above-described conditions.

With respect to a fine concavo-convex pattern (e.g., spherical pattern, lens pattern, prism pattern) constituting a light-diffusing or light-focusing film, a prism pattern is preferred due to easy and precise adjustment of brightness, haziness, and a viewing angle. Here, the term "prism pattern" refers to a prism pattern with a triangular sectional profile (hereinafter, referred to as simply "triangular prism pattern"). Although a prism pattern does not necessarily have a complete triangular sectional profile, a non-anisotropic prism pattern is preferred in order to uniformly focus light.

In order to achieve an enhancement in transmittance (front brightness) which is the most important factor among the performance factors of a film to enhance brightness, it is important to consider the wavelength of light and the shape and pattern pitch of a fine concavo-convex pattern. Enhancement in transmittance can be achieved by adjusting the pattern pitch of a concavo-convex pattern to 0.1 to 5 µm. If the pattern pitch of a fine concavo-convex pattern is less than 0.1 µm, the color of transmitted light may be visualized. Thus, by adjusting the pattern pitch of a fine concavo-convex pattern to the above range, unwanted coloration of transmitted light can also be prevented. In addition, a fine concavo-convex surface pattern of a resin film protects a constitutional member contacting with the resin film, and at the same time, has appropriate diffusion property, thereby providing hiding property which hides dots of a light guide plate. Such a resin film is disposed on at least one of upper and lower surfaces of a transparent substrate.

In conventional LCDs, constitutional members (e.g., a diffusing sheet, a prism sheet, a brightness enhancement sheet, a polarization plate, a phase contrast plate, a liquid crystal material, a color filter) of a surface light source unit are degraded by UV light leaked from light sources during long-time operation of the LCDs. In order to solve this problem, a method of protecting liquid crystal cells using a polarization plate protective film containing a UV absorber has been proposed (Japanese Patent Laid-Open Publication No. Hei. 11-246704).

In order to prevent UV leakage, placement of a UV-absorbing film as close as possible to fluorescent light in a backlight unit or addition of a UV absorber to a light guide plate can be considered. However, for the former method, it is necessary to use a film with good heat resistance, and for the latter method, a whole color change may occur due to partial absorption of visible light by the UV absorber. Recently, a method of converting a trace amount of UV light from a fluorescent tube to visible light using a UV absorber (e.g., magnesium oxide or titanium oxide) has been proposed to prevent UV leakage. According to this method, however, strong UV light is leaked from a light guide plate, and thus, when used for a long time, members constituting a surface light source unit appear yellowish.

As described above, various additives may be added to light-diffusing films in an amount such that a light-diffusing effect is not damaged. For example, the additives may be pigments, dyes, optical brightening agents, antioxidants, heat stabilizers, light stabilizers, weathering agents, antistatic agents, release agents, compatibilizing agents, etc. In particular, a method of offering diffusion property to a light-diffusing film in the presence of additives inevitably involves the use of a diffusion material in a resin. This changes a concavo-convex surface pattern, thereby making it difficult to precisely adjust brightness, haziness, and a viewing angle. In particular, a concavo-convex surface pattern is deformed and/or discolored by UV light emitted from an optical lamp, thereby adversely affecting optical characteristics and anti-sticking property.

When such a light-diffusing film is installed in a backlight unit, a side or a rear surface of the light-diffusing film is directly contacted to a light source (e.g., a lamp) due to the structural feature of an LCD. Thus, the light-diffusing film must be stabilized against heat generated when the light source is kept at an "ON" state. A plastic support film is thermally shrunk due to repeated generation and annihilation of heat by a light source. Such thermal shrinkage deforms an optical film fixedly placed in a predetermined frame such that a center portion of the optical film expands. As a result, uniform light transmission is not achieved, thereby making unwanted predetermined patterns on an LCD screen. Moreover, an adhesion power of a plastic support with a light-focusing layer coated on the plastic support is decreased, and thus, the light-focusing layer is separated from the plastic support with time, thereby adversely affecting uniform light-focusing and light-transmission properties, thereby resulting in a reduction in brightness of an LCD screen.

SUMMARY OF THE INVENTION

The present invention provides a multifunctional optical film that has a simple structure, and is useful in increasing the stability and front brightness of a display apparatus.

The present invention also provides a surface light source device including the multifunctional optical film.

The present invention also provides a display apparatus including the surface light source device.

According to an aspect of the present invention, there is provided a multifunctional optical film including:

a transparent substrate; and at least one of a light-focusing layer and a light-diffusing layer being disposed on at least a surface of the transparent substrate, wherein the light-focusing layer includes at least one selected from the group consisting of high-refractive silicone resins as represented by Formula 1 below, and wherein the light-diffusing layer includes at least one selected from the group consisting of low-refractive silicone resins as represented by Formula 2 below:

<Formula 1>

<Formula 2> wherein, $R_1, R_2, R_3, R_4$, and $R_5$ are each independently hydrogen, a substituted or unsubstituted C1-C30 aliphatic hydrocarbon, a substituted or unsubstituted C1-C30 aromatic hydrocarbon, a substituted or unsubstituted C1-C30 silyl group, a substituted or unsubstituted C1-C30 allyl group, a substituted or unsubstituted C1-C30 acyl group, an amine group, a halogen atom, a hydroxy group, a carboxyl group, a nitro group, or an alkaline metal;

M is silicon, aluminum, titanium, or zirconium; and $n_1, n_2, m_1$, and $m_2$ are each independently an integer of 2 to 300,000.

According to an embodiment of the present invention, the light-focusing layer including at least one selected from the group consisting of the high-refractive silicone resins as represented by Formula 1 may be disposed on a surface of the transparent substrate, and the light-diffusing layer including at least one selected from the group consisting of the low-refractive silicone resins as represented by Formula 2 may be disposed on the other surface of the transparent substrate.

According to an embodiment of the present invention, the light-focusing layer may include an array of a plurality of spheres, lenses, or linear triangular prisms.

According to an embodiment of the present invention, at least one groove may be formed in each of the prisms.

According to an embodiment of the present invention, the at least one groove may have a stepped structure.

According to an embodiment of the present invention, each of the linear triangular prisms may be truncated.

According to an embodiment of the present invention, the linear triangular prisms may be separated from each other by a distance of 0.1 to 5 μm.

According to an embodiment of the present invention, the linear triangular prisms may have a wavy structure in the lengthwise direction of the prisms.

According to another aspect of the present invention, there is provided a surface light source device illuminating a rear surface of a transmissive display unit and including:

a light source unit including an array of a plurality of light sources; and the above-described multifunctional optical film on which light from the light sources of the light source unit is incident.

According to another aspect of the present invention, there is provided a liquid crystal display including:

a transmissive display unit; and a surface light source device illuminating a rear surface of the transmissive display unit, wherein the surface light source device includes the above-described multifunctional optical film.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

The present invention provides a multifunctional optical film having a smooth surface or a fine concavo-convex surface pattern (e.g., spherical pattern, lens pattern, prism pattern, etc.), and at the same time, good light-focusing and/or —diffusing property, mechanical strength, and production efficiency, as a result of using a silicone resin that has good UV-shielding, light transmission, and heat resistance properties and can control a refractive index in an easy and precise manner.

Figure 3:
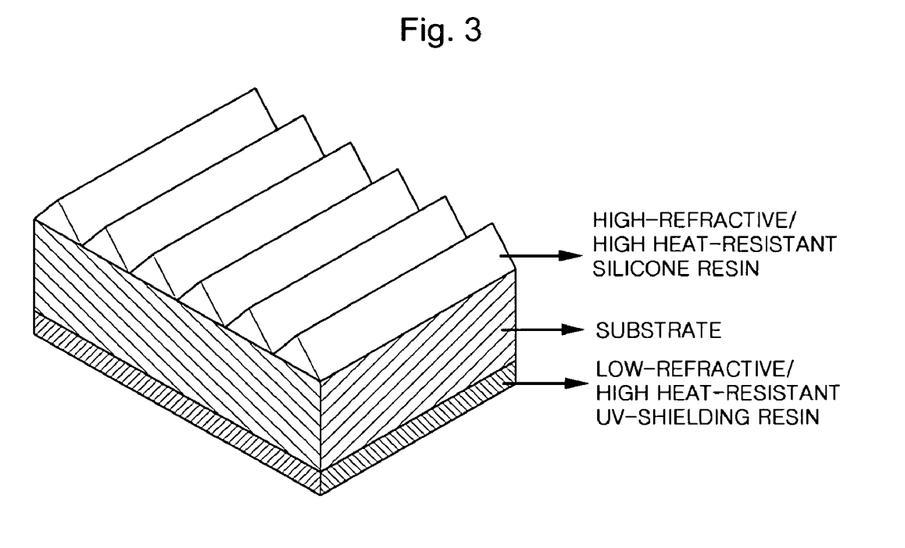
FIGS. 3 through 5 illustrate optical films according to embodiments of the present invention.
Figure 4:
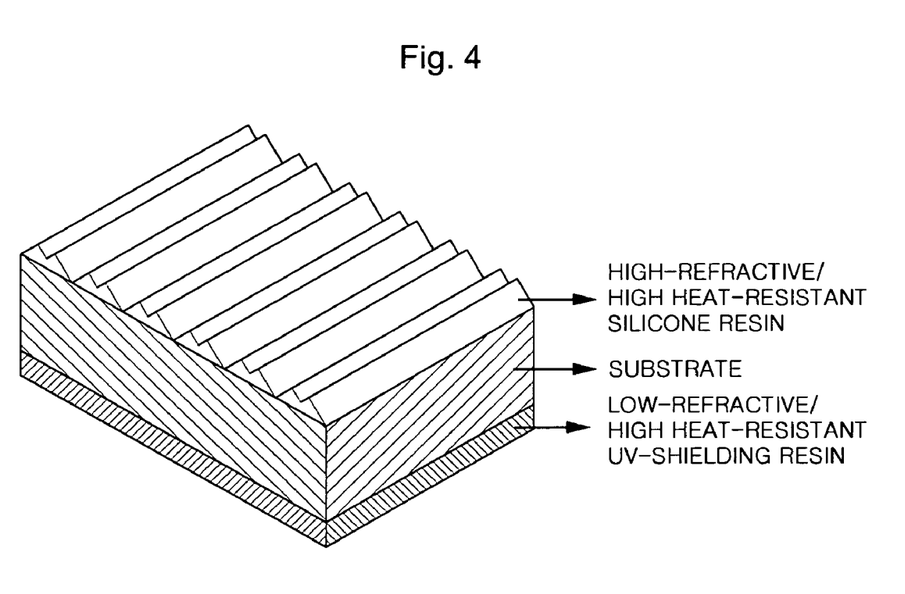
Figure 5:
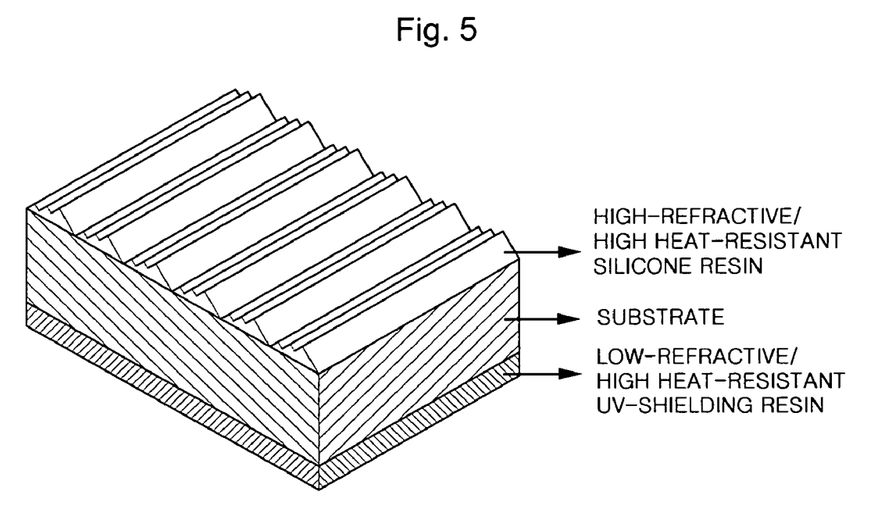

In a multifunctional optical film according to an embodiment of the present invention, silicone resin layer(s), e.g., a plurality of resin layers with different refractive indices may be disposed on a surface or both surfaces of a transparent substrate. In particular, a light-diffusing layer with a low refractive index may be disposed on a lower surface of a transparent substrate, and a light-focusing layer with a high refractive index may be disposed on an upper surface of the transparent substrate. Optical films according to embodiments of the present invention are illustrated in FIGS. 3 through 5.

In particular, a multifunctional optical film having UV-shielding and heat resistance properties according to an embodiment of the present invention shields UV light generated from a light source (e.g., a fluorescent tube) of a flat surface light source device (e.g., a backlight unit (BLU)), thereby preventing degradation of a prism sheet and liquid crystal display (LCD) cells. Furthermore, the use of such an optical film can simplify the structures of surface light source devices and LCDs, and can improve or uniformly distribute the brightness of a display surface even when the optical film is anisotropic. Still furthermore, a high-quality optical film with no curl and bending phenomena can be produced due to good heat resistance. In addition, a multifunctional optical film according to an embodiment of the present invention can enhance front brightness with respect to a light source due to good optical characteristics, and thus, can be efficiently used in variously structured surface light source devices and LCDs.

As used herein, the term "film" is meant to comprehend a sheet regardless of thickness.

In a multifunctional optical film according to an embodiment of the present invention, a light-focusing layer and/or a light-diffusing layer may be formed on a surface or both surfaces of a transparent substrate. Preferably, a light-diffusing layer may be disposed on a lower surface of a transparent substrate, and a light-focusing layer may be disposed on an upper surface of the transparent substrate.

The light-diffusing layer serves to diffuse light incident from a light source, and may be formed of a UV-shielding resin with a low refractive index and good heat resistance, more preferably, at least one selected from the group consisting of silicone resins as represented by Formula 2 below. The light-diffusing layer may be disposed on a lower surface of the transparent substrate and may have no special pattern or a fine diffusion lens pattern (a projection pattern).

The light-focusing layer disposed on the upper surface of the transparent substrate serves to converge light incident from the transparent substrate, and may have various fine concavo-convex patterns, e.g., a spherical pattern, a lens pattern, or a triangular prism pattern. In particular, the light-focusing layer may use at least one resin selected from the group consisting of silicone resins with high refractive index and good heat resistance as represented by Formula 1 below.

wherein, $R_1$, $R_2$, $R_3$, $R_4$, and $R_5$ are each independently hydrogen, a substituted or unsubstituted C1-C30 aliphatic hydrocarbon, a substituted or unsubstituted C1-C30 aromatic hydrocarbon, a substituted or unsubstituted C1-C30 silyl group, a substituted or unsubstituted C1-C30 allyl group, a substituted or unsubstituted C1-C30 acyl group, an amine group, a halogen atom, a hydroxy group, a carboxyl group, a nitro group, or an alkaline metal;

M is silicon, aluminum, titanium, or zirconium; and $n_1$, $n_2$, $m_1$, and $m_2$ are each independently an integer of 2 to 300,000.

In silicone resins as represented by Formula 2, $R_4$ may be an aliphatic functional group such as a methamethylacrylpropyl group, an acrylproyl group, a methamethylacryl group, an acryl group, a glycidoxypropyl group, an epoxy group, or an isocyanate group, and $R_5$ may be an aromatic functional group such as a phenyl group or a phenol group.

The refractive index of the light-focusing layer constituting the multifunctional optical film can be adjusted according to $R_1$, $R_2$, or $R_3$ which is a substituent of a compound of Formula 1. The ratio of $R_1/R_2/R_3$ may be as follows: $R_1$=5~15%, $R_2$=8~40%, and $R_3$=60~90% with proviso that $R_1+R_2+R_3$=100%. In particular, $R_3$ may be phenyl (refractive index=1.56), 9-fluorenyl (refractive index=1.59), or 9-anthracenyl (refractive index=1.62). $R_1$ and $R_2$ may each be an epoxy group, an amino group (refractive index=1.58), etc. The refractive index of a compound of Formula 2 can also be changed according to a substituent.

That is, the refractive index of a compound of Formula 2 can be adjusted according to $R_4$ or $R_5$. The ratio of $R_4/R_5$ may be as follows: $R_4$=8~40% and $R_5$=60~90% with proviso that $R_4+R_5$=100%. In particular, $R_5$ may be hydrodo (refractive index=1.38) or methyl (refractive index=1.42).

With respect to the refractive index of the light-focusing layer, it is preferred that a refractive index difference between a substrate and a compatible resin should be greater than the refractive index of the substrate. Preferably, a refractive index difference between a substrate and a resin may be 0 to 0.1. Refractive index measurement can be performed by an ABBE refractometer using a sodium D line (wavelength of 589 nm) as a light source.

A silicone resin of Formula 1 constituting the light-focusing layer may be (meth)acrylsilane, epoxysilane, isocyanatesilane, etc. of a polyfunctional (e.g., polyhydric alcohol or polychloro) photo-curable silane compound. The silicone resin of Formula 1 may be in the form of an oligomer, a prepolymer, a polymer, a copolymer, etc. Preferably, a silicone resin of Formula 1 may be phenylmethacrylsilane, a silicone-based composite resin composed of phenylmethacrylsilane, etc. When a silicone resin of Formula 1 is used as a thermosetting resin, it may form a copolymer composition, together with metal oxide, in order to assure a refractive index and other functions.

When a silicone resin of Formula 1 is used as a UV-curable resin, a photoinitiator may be used. For example, the photoinitiator may be selected from acetophenones, benzophenones, Michler's benzoyl benzoates, α-amyloximesters, and thioxantones. A photosensitizer may be N-butylamine, triethyl, tri-n-butylphosphine, etc. When the photosensitizer is used as a thermosetting resin, it can be used as a heat-curing accelerator.

A common silicone resin is composed of a 100% siloxane bond (Si—O—Si) and 10-30% silanol (Si—OH). A common silicone resin can absorb UV light due to the 100% siloxane bond, but UV light absorption cannot be sufficiently performed by an increase in the number of lamps due to a large-size trend for monitors. Thus, in a light-diffusing layer according to an embodiment of the present invention, a silanol moiety of a silicone resin is substituted by silanate (Si—O-M; M is metal), thereby improving UV absorption ability.

A light-focusing layer disposed on a transparent substrate according to the present invention may have various fine patterns, e.g., a spherical pattern, a linear prism pattern, or a lens pattern. A linear array of a plurality of triangular prisms is preferred. Here, a triangular sectional profile of each of the triangular prisms can be defined by an edge (corresponding to a base edge of the triangular sectional profile) of a light-focusing layer contacting with a transparent substrate and base angles with respect to the base edge. The base angles may each be 30 to 60 degrees, more preferably 45 degrees.

In a triangular prism pattern which is an example of the shape of a light-focusing layer according to the present invention, a triangular prism may be a simple isosceles triangular prism, but at least one groove may also be formed on the prism. Such a groove may be formed in a predetermined shape on a triangular prism. Preferably, the groove may be in the form of an inverting triangular prism. Here, the vertex angle of the inverting triangular prism may be about 70 to 110 degrees.

When only one groove is formed on a unit triangular prism, two vertex angles are formed in the prism. The lengths of side edges defining a vertex angle may be the same as or different from those of corresponding opposing ones of side edges defining the other vertex angle. When the lengths of side edges defining a vertex angle are the same as those of corresponding opposing ones of side edges defining the other vertex angle, two same triangular prisms are formed in a unit triangular prism. On the other hand, when the lengths of side edges defining a vertex angle are different from those of corresponding opposing ones of side edges defining the other vertex angle, two triangular prisms which are different in size and height are formed. When a plurality of grooves, e.g., two grooves are formed in a unit triangular prism, three vertex angles may be formed in the prism. As described above, the lengths of side edges defining a vertex angle may be the same as or different from those of corresponding opposing ones of side edges defining another vertex angle. Further, vertices of the grooves may form a stepped pattern. Examples of triangular prisms with grooves are illustrated in FIGS. 4 and 5.

Optical characteristics of a multifunctional optical film according to the present invention can be changed according to the lengths of the base edges of triangular prisms contacting with a transparent substrate. Preferably, the lengths of the base edges of the triangular prisms may be about 55 to 65 μm. If the lengths of the base edges of the triangular prisms are outside the above range, optical characteristics of a multifunctional optical film may be lowered.

In particular, top portions of the triangular prisms correspond to lateral edges of geometrical triangular prisms, and may be straight lines. However, in order to prevent light staining, etc., top portions of the triangular prisms may have a wavy structure. The top portions of the triangular prisms may also be sharp-edged, but may also be flattened in order to prevent breakdown or an adhesion reduction that may be caused when joined together another member. In this case, the top portions of the triangular prisms may be about 1 to 5 μm in width.

The unit triangular prisms which are linearly arranged may be spaced apart from each other in the lengthwise direction of a substrate. Here, a distance between adjacent two of the unit triangular prisms may be about 0.1 to 5 μm. In this case, a flat pattern, a concave pattern, and a fine concavo-convex pattern may be formed between the unit triangular prisms.

Triangular prisms according to embodiments of the present invention are illustrated in FIGS. 6 through 16.

A transparent substrate having thereon a light-focusing layer and/or a light-diffusing layer may be formed of an optical flat panel display (FPD) thermoplastic resin, e.g., an acryl resin such as methylmethacrylate or ethylmethacrylate; polyester such as polyethyleneterephthalate, polybutyleneterephthalate, or polyethylenenaphthalate; polyhydrocarbon such as polycarbonate, polystyrene, polypropylene, or polymethylpropylene; polyamide such as Nylon 6,6, or Nylon 6; an ethylene/vinyl acetic acid copolymer, polyimide, polysulfone, polyvinylchloride, or acetylcellulose. The transparent substrate may be an isotropic or anisotropic film with a thickness of about 10 to 200 μm.

Hereinafter, a method of forming a multifunctional optical film as described above will be described.

When forming a multifunctional optical film according to an embodiment of the present invention, first, a film with a fine pattern is prepared.

Figure 17:
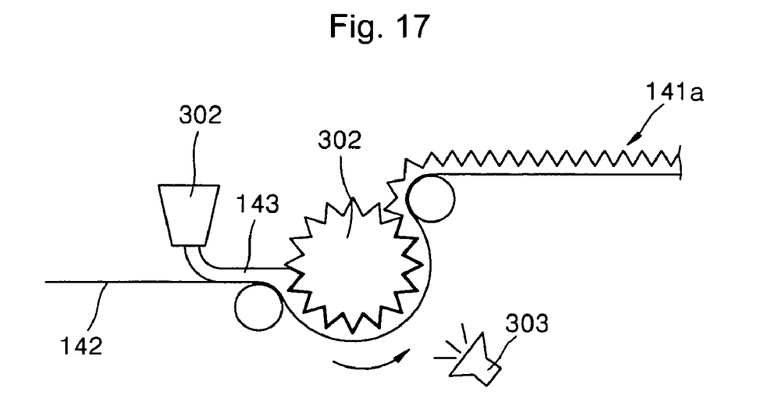
FIGS. 17 and 18 are schematic views illustrating methods of forming optical films according to embodiments of the present invention.
Figure 18:
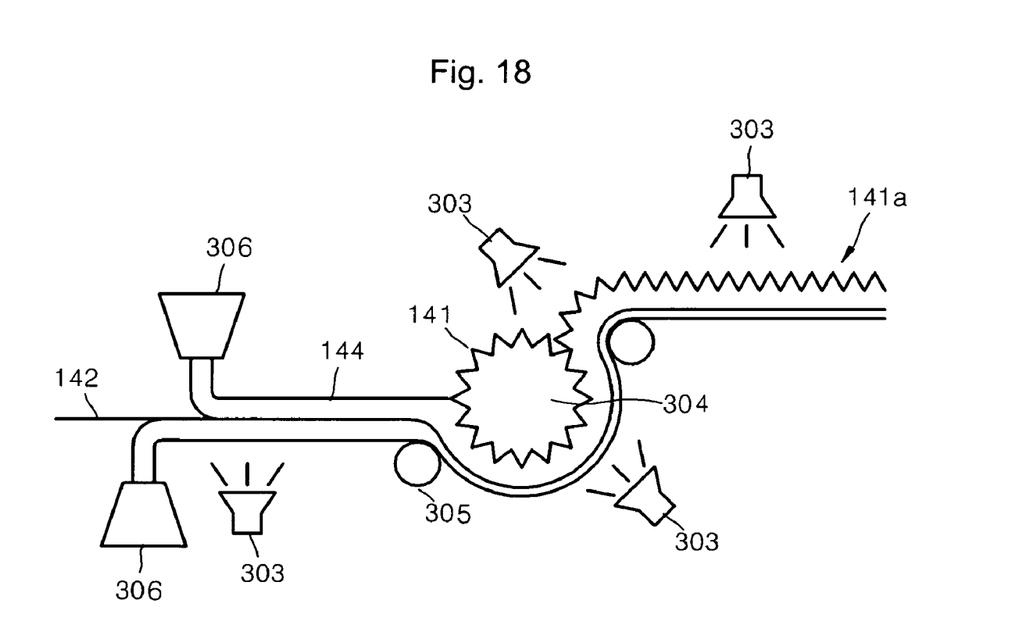

FIGS. 17 and 18 are views illustrating two methods of forming optical films. For convenience of illustration, FIGS. 17 and 18 illustrate that the lengthwise direction of each pattern of optical films formed using dies is the direction of the rotation center axis of the dies. However, the lengthwise direction of each pattern of optical films may also be the direction of the rotation circumference of dies. The latter case is more preferable than the former case due to easier film formation.

FIG. 17 is a view illustrating a so-called "UV molding" method for forming an optical film. Referring to FIG. 17, first, a UV-curable resin 143 from a resin supply unit 302 is coated on a transparent substrate 142 formed of polycarbonate. Then, the transparent substrate 142 on which the UV-curable resin 143 is coated is rolled onto a die 301 with female molds 141. In this state, the transparent substrate 142 is exposed to a UV light source 303 to cure the UV-curable resin 143, thereby giving an optical film 141a with a pattern transferred from the pattern of the female molds 141 of the die 301.

FIG. 18 is a view illustrating a so-called "extrusion molding" method for forming an optical film. Referring to FIG. 18, a molten resin 144 is supplied from a resin supply unit 306 and cooled while flowing between a die 304 with female molds 141 and a roller 305, to thereby form an optical film 141a with a pattern transferred from the pattern of the female molds 141 of the die 304.

An optical film thus-formed, when used alone, cannot assure sufficient film strength and film flatness. Thus, the optical film is integrally formed on a transparent substrate layer. By doing so, the strength of the optical film can be increased, thereby increasing flatness. The integral formation of an optical film on a substrate layer may be performed by either attachment of the optical film on the substrate layer or thermal lamination of the optical film on the substrate layer upon formation of the substrate layer.

According to the above-described method, an optical film with good strength and flatness can be stably produced in a cost-effective manner.

An optical film thus-formed can be used in a direct-type surface light source device or an edge-type surface light source device. In detail, the present invention provides a surface light source device including: a light source unit illuminating a rear surface of a transmissive display unit and including an array of a plurality of light sources; and an optical film according to an embodiment of the present invention used as a prism sheet focusing light emitted from the optical sources of the light source unit. Here, the optical film may be disposed near the light sources generating light. The surface light source device may further include at least one of a diffusing sheet and a protective sheet, in addition to an optical film according to an embodiment of the present invention. The diffusing sheet may be interposed between the light source unit and the prism sheet, and the protective sheet may be disposed on the outermost surface of the surface light source device in order to protect these sheets.

The present invention also provides a transmissive display apparatus including: a transmissive display unit; and a surface light source device illuminating a rear surface of the transmissive display unit, the surface light source device including a multifunctional optical film according to an embodiment of the present invention.

Figure 19:
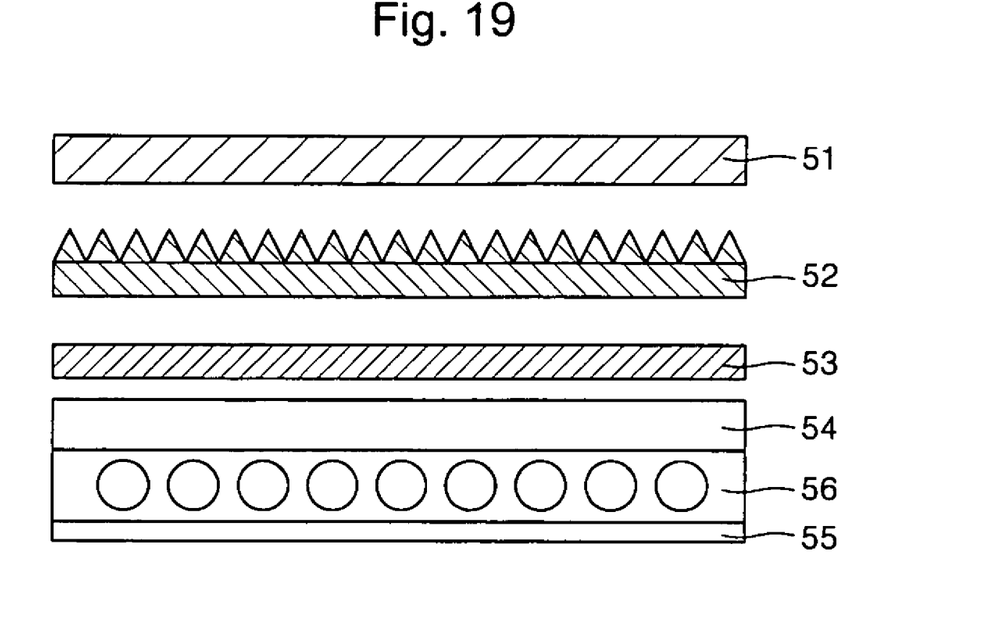
FIG. 19 illustrates a liquid crystal display including a direct-type surface light source device according to an embodiment of the present invention.
Figure 20:
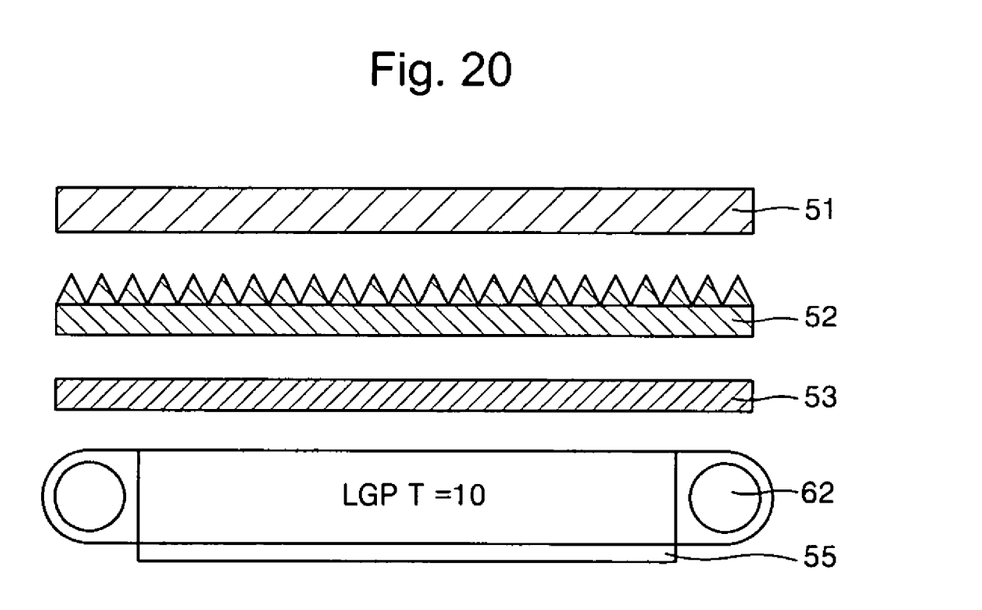
FIG. 20 illustrates a liquid crystal display including an edge-type surface light source device according to an embodiment of the present invention.

Transmissive display apparatuses according to embodiments of the present invention are illustrated in FIGS. 19 and 20. FIG. 19 illustrates a liquid crystal display including a direct-type surface light source device, and FIG. 20 illustrates a liquid crystal display including an edge-type surface light source device. Referring to FIG. 19, the liquid crystal display includes a protective sheet 51, an optical film 52 including a light-focusing layer, a light-diffusing layer 53, a light guide plate 54 having scattering dots, a reflective plate 55, and a light source 56. Referring to FIG. 20, the liquid crystal display includes a protective sheet 51, an optical film 52 including a light-focusing layer, a light-diffusing layer 53, a reflective plate 55, and a light source 62.

Hereinafter, the present invention will be described more specifically with reference to the following working examples. The following working examples are for illustrative purposes only and are not intended to limit the scope of the invention.

Transmittance and Haziness

Transmittance and haze values were measured using a totally automatic direct-reading haze computer (HGM-2, Suga Test Instruments).

Light Resistance

Films were continuously exposed to UV light from a UV lamp (365 nm) for 15 hours, 50 hours, and 100 hours to evaluate a yellowing phenomenon or a color change due to UV light.

Film Surface Templating

A photo-curable silicone resin and a photoinitiator were mixed in a weight ratio of 9:1, and the reaction mixture was subjected to air bubble removal under vacuum while stirring for 20 minutes. Then, the resultant resin composition was bar-coated on polyethyleneterephthalate (PET) films with a thickness of 125 μm, strongly pressed under a pressing roller, and cured under light from a UV lamp or a mercury lamp with an energy of 360 mJ/cm$^2$ for 2 seconds to thereby form films.

Thermocondensation reaction type silicone SH9555 and its corresponding hardening agent SH9555K (Silicone Co.) were mixed in a weight ratio of 9:1, and air bubbles were removed from the reaction mixture under vacuum while stirring for 20 minutes. Then, the resultant silicone rubber composition was coated onto PET films with a thickness of 100 μm, and a sample surface sought to be templated was placed thereon and strongly pressed under an ink roller. The resultant structures were thermally treated at 60° C. for 30 minutes to cure the silicone rubber. The samples were peeled away, and a thermosetting silicone composition was poured into a mold frame and thermally treated at 120° C. for 30 minutes (soft lithography).

Photopolymerizable Composition

Preparation of Basic Silicone-Based Resin

Phenyl-silane, methyl-silane, or H-silane (hydrodo-silane) was used as trifunctional mono-silane to adjust a refractive index, and methacryl-silane was used to give a photo-curing property. The trifunctional mono-silane and the methacryl-silane were used in a molar ratio (mol wt %) in order to precisely adjust a refractive index. Triphenyl-silane, which was monofunctional mono-silane, and tetrafunctional zirconia (Zr—O), alumina (Al—O), or titania (Ti—O) were used to precisely adjust a refractive index. The mixed mono-silanes were hydrolyzed using a direct hydrolysis process (see: Korean Patent Laid-Open Publication No. 2003-0029647, U.S. Pat. No. 6,787,625 B2, Chinese Pat. No. CN1162461C, PCT PCT/KR/00237) and then polycondensed to synthesize a copolymer. A photoinitiator I-184 (Ciba Geigy Speciality Chemicals, 2.5 wt % of the methacryl-silane] was used, and a mixed alcohol solvent was used as a coating solvent. The reaction mixture was subjected to air bubble removal while stirring under vacuum for 20 minutes. A 0.4 μm nylon filter was used as a filter, and a solid content of the resultant composition was adjusted to 60 wt %. Such a silicone resin has both thermosetting (curing condition: 120° C./20 min) and photo-curing (360 mJ/cm$^2$) properties.

In order to impart a UV-shielding property to the above-described silicone resin capable of precisely adjusting a refractive index, the silicone resin was end-capped (see: Korean Patent Laid-Open Publication No. 2003-0029647, U.S. Pat. No. 6,787,625 B2, Chinese Pat. No. CN1162461C, PCT PCT/KR/00237, etc.). The end-capping amount was 10 to 20 wt % of the silicone resin. The end-capped silicone resin was prepared and used in the form of a coating solution as described above.

COMPARATIVE EXAMPLE 1

Preparation of Basic Organic Resin 50 parts by weight of an acrylic monomer KAYARAD HX-620 (Nippon Kayaku Co.), 50 parts by weight of chlorinated polyester oligomer Ebecryl EB-584 (Daicel UCB), 10 parts by weight of a photoinitiator I-184 (Ciba Geigy Speciality Chemicals), and 2 parts by weight of a photopolymerization accelerator Kayacure EPA (Nippon Kayaku Co.) were polymerized to prepare an organic resin.

COMPARATIVE EXAMPLE 2

Preparation of Basic Organic Resin 50 parts by weight of an acrylic monomer KAYARAD HX-620 (Nippon Kayaku Co.), 50 parts by weight of chlorinated polyester oligomer Ebecryl EB-1129 (Daicel UCB), 10 parts by weight of a photoinitiator I-184 (Ciba Geigy Speciality Chemicals), and 2 parts by weight of a photopolymerization accelerator Kayacure EPA (Nippon Kayaku Co.) were polymerized to prepare an organic resin.

EXAMPLE 1

Preparation of Basic Photo-curable Silicone Resin (Ph/MMA=88/12)

Trifunctional phenyl-silane and methacryl-silane were mixed in a molar ratio of 88:12. The reaction mixture was hydrolyzed using a direct hydrolysis process, and the resultant hydrolysate was polycondensed to synthesize a UV-curable silicone resin in the form of a copolymer where a ratio of a phenyl group to a methacryl group was 88:12 and a number average molecular weight was about 2,500 (ABBE refractive index=1.542).

The UV-curable silicone resin was mixed with a photoinitiator I-184 (2.5 mol % of the methacryl moiety) and a dilute solvent IPA to obtain a UV-curable silicone resin composition with a solid of 60 wt % (viscosity=450 dpi).

EXAMPLE 2

Preparation of Basic Photo-curable Silicone Resin (ph/MMA=60/40)

Trifunctional phenyl-silane and methacryl-silane were mixed in a molar ratio of 60:40. The reaction mixture was hydrolyzed using a direct hydrolysis process, and the resultant hydrolysate was polycondensed to synthesize a UV-curable silicone resin in the form of a copolymer where a ratio of a phenyl group to a methacryl group was 88:12, and a number average molecular weight was about 2,600 (ABBE refractive index=1.522)

The UV-curable silicone resin was mixed with a photoinitiator I-184 (2.5 mol % of the methacryl moiety) and a dilute solvent IPA to obtain a UV-curable silicone resin composition with a solid of 60 wt % (viscosity=450 dpi).

As illustrated in FIG. 17, first, each UV-curable silicone resin composition prepared in Examples 1 and 2, which was supplied from a resin supply unit, was coated to a thickness of 15 μm on PET base films (thickness: 125 μm, refractive index: 1.498). Then, the base films on which the UV-curable silicone resin composition was coated were rolled onto a die with female molds. In this state, the base films were exposed to UV light from a UV light source to cure the UV-curable resin, thereby giving optical films having a pattern transferred from the pattern of the female molds of the die.

Examples of sectional profiles of light-focusing layers constituting upper portions of the optical films are illustrated in FIGS. 6 through 16.

EXAMPLE 3

Preparation of Triphenylchlorosilane End-capped Silicone Resin Capable of Precisely Adjusting Refractive Index 18 wt % of the silicone resin prepared in Example 1 was added to benzene. 5 wt % of triethylamine (based on the silicone resin) was added thereto, and then 10 wt % of triphenylchlorosilane (based on the silicone resin) was dropwise added thereto under a nitrogen atmosphere. The reaction mixture was incubated at room temperature for three hours.

After the reaction was terminated, the precipitate was removed by filtration, and the residual solution was re-precipitated with methanol to obtain a triphenylchlorosilane end-capped silicone resin (yield: 98%, refractive index=1.531).

The silicone resin was mixed with a photoinitiator I-184 (2.5 mol % of the methacryl moiety) and a dilute solvent IPA to obtain a silicone resin composition with a solid of 60 wt % (viscosity=450 dpi).

Optical films were made in the same manner as in Example 1 using the silicone resin composition.

EXAMPLE 4

Preparation of Zr—(OR)4 End-capped Silicone Resin Capable of Precisely Adjusting Refractive Index 18 wt % of the silicone resin prepared in Example 1 was added to toluene. 0.01 wt % of hydrochloric acid (based on the silicone resin) was added thereto, and the reaction mixture was incubated in a reaction bath of −5° C. under a nitrogen atmosphere. Then, 10 wt % of Zr—(Oipr)4 (based on the silicone resin) was dropwise added to the reaction solution using a dropping funnel under a nitrogen atmosphere, and the reaction mixture was incubated for 16 hours. After the reaction was terminated, the resultant solution was precipitated with methanol to give a Zr—(OR)4 end-capped silicone resin (yield: 98%, refractive index: 1.549).

The Zr—(OR)4 end-capped silicone resin was mixed with a photoinitiator I-184 (2.5 mol % of the methacryl moiety) and a dilute solvent IPA to obtain a silicone resin composition with a solid of 60 wt % (viscosity=510 dpi).

Optical films were made in the same manner as in Example 1 using the silicone resin composition.

EXAMPLE 5

Preparation of Low-refractive, UV-shielding Silicone Resin (Me/MMA=88/12)

Trifunctional methyl-silane and methacryl-silane were mixed in a molar ratio of 88:12. The reaction mixture was hydrolyzed using a direct hydrolysis process, and the resultant hydrolysate was polycondensed to synthesize a silicone resin in the form of a copolymer where a ratio of a methyl group to a methacryl group was 88:12, and a number average molecular weight was about 3,200 (ABBE refractive index=1.362)

18 wt % of the silicone resin was dissolved in IPA, and 30 wt % of $Na_2SO_4$ (based on the silicone resin) was then added thereto. Then, 0.001 wt % of a reaction catalyst, sulfuric acid was added thereto, and the reaction mixture was incubated in a reaction bath of 60° C. under a nitrogen atmosphere for 18 hours. Unreacted $Na_2SO_4$ was removed by filtration, and the residual solution was re-precipitated with methanol to give a silicone resin (yield: 98%, UV-shielding efficiency: 98%, refractive index=1.38).

The silicone resin was mixed with a photoinitiator I-184 (2.5 mol % of the methacryl moiety) and a dilute solvent IPA to obtain a silicone resin composition with a solid of 60 wt % (viscosity=410 dpi).

As illustrated in FIG. 18, first, separate substrate films with a predetermined size were prepared. The above-prepared silicone resin composition, which was supplied from a resin supply unit, was coated on the substrate films. In this state, the resultant structures were exposed to UV light from a UV light source to cure the silicone resin, thereby giving optical films wherein the resin films were integrally formed on the substrate films.

EXAMPLE 6

Preparation of Low-refractive, UV-shielding Silicone Resin (Me/MMA=88/12)

Trifunctional methyl-silane and methacryl-silane were mixed in a molar ratio of 88:12. The reaction mixture was hydrolyzed using a direct hydrolysis process, and the resultant hydrolysate was polycondensed to synthesize a silicone resin in the form of a copolymer where a ratio of a methyl group to a methacryl group was 88:12, and a number average molecular weight was about 3,200 (ABBE refractive index=1.423).

18 wt % of the silicone resin was dissolved in toluene, and 0.01 wt % of hydrochloric acid (based on the silicone resin) was added thereto. The reaction mixture was incubated in a reaction bath of −5° C. under a nitrogen atmosphere. Then, 10 wt % of Ti—(Oipr)$_4$ was dropwise added to the reaction solution using a dropping funnel under a nitrogen atmosphere, and the reaction mixture was incubated for 16 hours. After the reaction was terminated, the resultant solution was precipitated with methanol to give a silicone resin (yield: 98%, refractive index=1.469, UV-shielding efficiency: 98%).

The silicone resin was mixed with a photoinitiator I-184 (2.5 mol % of the methacryl moiety) and a dilute solvent IPA to obtain a silicone resin composition with a solid of 60 wt % (viscosity=550 dpi).

TABLE 1

| Sample | Transmittance (%) | Haze (%) | Hardness (H) | Refractive index | Brightness increase (%) | UV-shielding efficiency (%) | Yellowing (100 hr) | Heat resistance (° C.) |
|---|---|---|---|---|---|---|---|---|
| Comparative Example 1 | 100 | <3 | 2 | 1.56 | 100 | 12 | Wrinkle | <180 |
| Comparative Example 2 | 100 | <2 | 1 | 1.47 | 91 | 12 | No Wrinkle | <160 |
| Example 1 | 100 | <1 | 3 | 1.542 | 100 | 58 | No Wrinkle | >400 |
| Example 2 | 100 | <1 | 3 | 1.522 | 97 | 59 | No Wrinkle | >400 |
| Example 3 | 100 | <1 | 3 | 1.531 | 99 | 59 | No Wrinkle | >400 |
| Example 4 | 100 | <1 | 3 | 1.549 | 102 | 61 | No Wrinkle | >400 |
| Example 5 | 100 | <1 | 3 | 1.362 | — | 98 | No Wrinkle | >450 |
| Example 6 | 100 | <1 | 6 | 1.469 | — | 98 | No Wrinkle | >480 |

EXAMPLE 7

As illustrated in FIG. 17, first, the UV-curable silicone resin composition prepared in Example 1, which was supplied from a resin supply unit, was coated to a thickness of 15 μm on PET base films (thickness: 125 μm, refractive index: 1.498). Then, the base films on which the UV-curable resin composition was coated were rolled onto a die having female molds. In this state, the base films were exposed to UV light from a UV light source to cure the UV-curable resin, thereby giving optical films having a pattern transferred from the pattern of female molds of the die.

Figure 6:
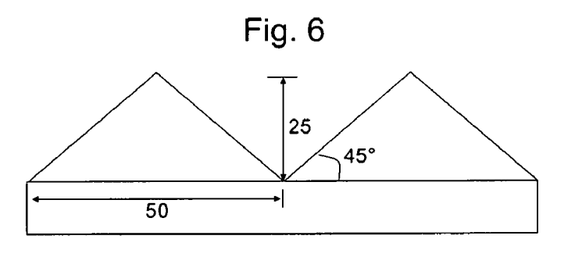
FIGS. 6 through 16 illustrate patterns of triangular prisms according to embodiments of the present invention.

The sectional profile of a unit projection of the optical films is as illustrated in FIG. 6.

EXAMPLE 8

As illustrated in FIG. 17, first, the UV-curable silicone resin composition prepared in Example 5, which was supplied from a resin supply unit, was coated to a thickness of 1 μm on lower surfaces of PET base films (thickness: 125 μm, refractive index: 1.498). Then, the UV-curable silicone resin composition prepared in Example 1, which was supplied from a resin supply unit, was coated to a thickness of 15 μm on upper surfaces of the PET base films. Then, the base films on which the resin compositions were coated were rolled onto a die having female molds. In this state, the base films were exposed to UV light from a UV light source to cure the UV-curable resin, thereby giving optical films having a pattern transferred from the pattern of the female molds of the die.

TABLE 2

| Section | | Example 7 | | Example 8 | |
|---|---|---|---|---|---|
| Haze(%) | | 87.64 | Average: 87.47 | 88.65 | Average: 88.46 |
| | | 87.70 | | 88.75 | |
| | | 87.75 | | 88.36 | |
| | | 87.32 | | 88.40 | |
| | | 86.98 | | 88.16 | |
| Front brightness | | 4.57 | Average: 4.57 | 6.22 | Average: 6.06 |
| | | 4.59 | | 7 | |
| | | 4.49 | | 6.06 | |
| | | 4.10 | | 5.57 | |
| | | 5.13 | | 5.46 | |
| Brightness increase (%) | | Single sheet | 2 | Single sheet | 2 |
| | | Two cross sheets | 3 | Two cross sheets | 3 |
| Film thickness (μm) | | PET film | 125 | PET film | 125 |
| | | Silicone binder | 25 | Silicone binder | 25 |
| | | UV-shielding binder | — | UV-shielding binder | 1 |
| Curl (80° C./85% RH) | | No Curling | | No Curling | |
| Heat resistance (hr) | | 15 | No Wrinkle | 15 | No Wrinkle |
| | | 50 | | 50 | |
| | | 100 | | 100 | |
| Hardness (H) | | 3H | | 3H | |
| Adhesion force | | Cross cut test | Good | Cross cut test | Good |
| Appearance | | Visual observation | Good | Visual observation | Good |
| UV-shielding efficiency | | — | — | — | 98% |

The results of Table 2 show that even when a composite film stack is formed using a UV-shielding/heat resistant/low-refractive silicone resin according to an embodiment of the present invention, the composite film stack does not affect front brightness, like conventional films.

EXAMPLE 9

Direct-type surface light source devices were manufactured using the optical films prepared in Example 8 as prism sheets and are as illustrated in FIG. 19. The surface light source devices were 760×450×47 in size. Here, upper protective sheets, the prism sheets, diffusing sheets, light guide plates, and reflective sheets were formed to a thickness of 0.40 mm, 0.28 mm, 0.22 mm, 2 mm, and 1 mm, respectively. Twenty lamps with a diameter of 4 mm were used.

EXAMPLE 10

Edge-type surface light source devices were manufactured using the optical films prepared in Example 1 as prism sheets and are as illustrated in FIG. 20. The surface light source devices were 404.2×330×2 mm in size. Here, protective sheets, prism sheets, diffusing sheets, and reflective sheets were formed to a thickness of 0.21 mm, 0.28 mm, 0.22 mm, and 0.18 mm, respectively. Two lamps with a thickness of 4 mm were used.

EXPERIMENTAL EXAMPLE 1

Figure 7:
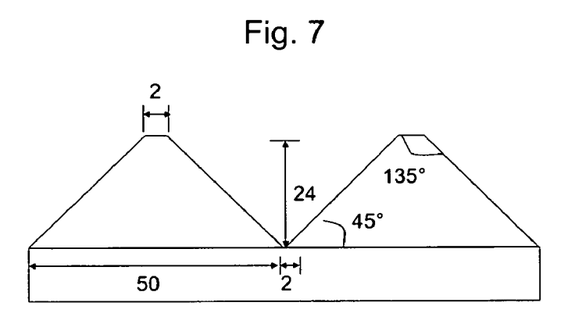
Figure 8:
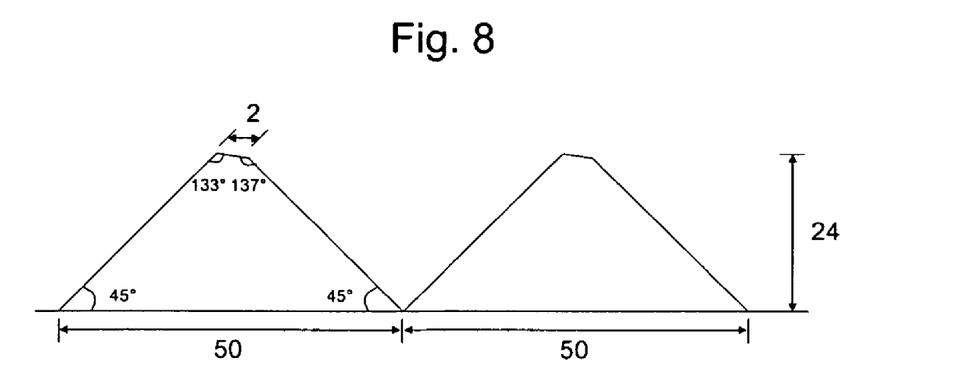

The brightness and viewing angle of the optical films prepared in Example 1 were measured at a vertical position with respect to prism sheets (Comparative Examples 1 and 2, see FIG. 8), and the results are presented in Table 3 below. The brightness and viewing angle of the optical films prepared in Example 1 were also measured at a horizontal position with respect to the prism sheets, and the results are presented in Table 4 below.
The measurement conditions were as follows.
Sheet size: 1.2 cm×1.2 cm
Rays: 150,000
Light source: Lambertian light source
Film stacks wherein the optical films had upper fine patterns as illustrated in FIG. 7 were manufactured.

EXPERIMENTAL EXAMPLE 2

Figure 9:
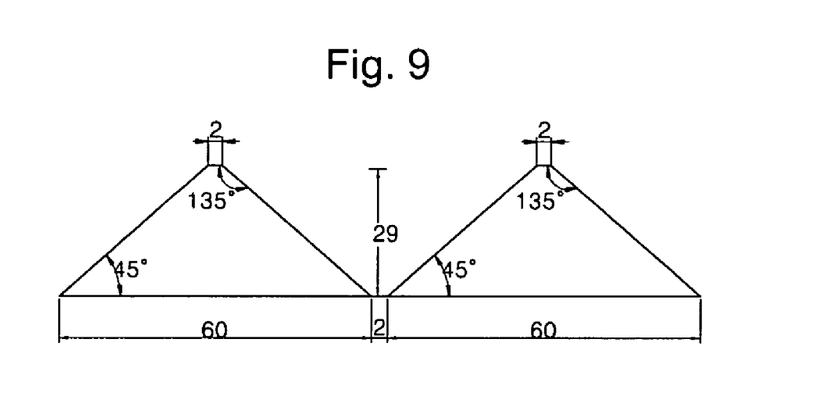

Films stacks were manufactured in the same manner as in Experimental Example 1 except that upper fine patterns of the optical films were as illustrated in FIG. 9.

EXPERIMENTAL EXAMPLE 3

Figure 10:
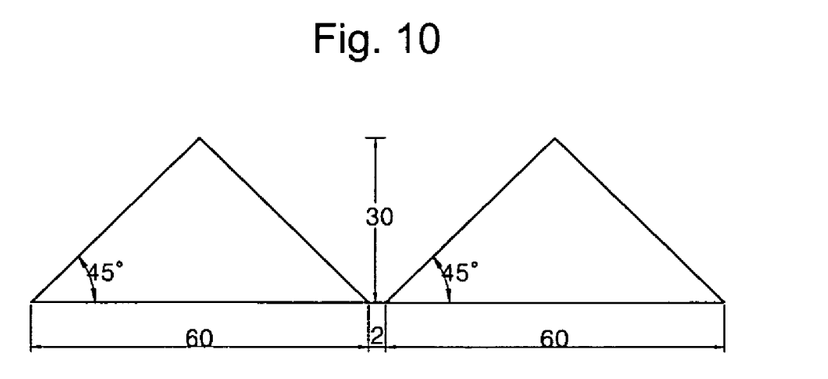

Films stacks were manufactured in the same manner as in Experimental Example 1 except that upper fine patterns of the optical films were as illustrated in FIG. 10.

EXPERIMENTAL EXAMPLE 4

Figure 11:
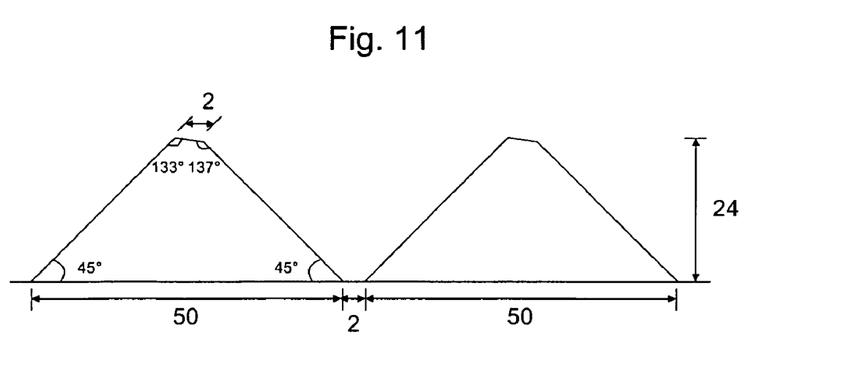

Films stacks were manufactured in the same manner as in Experimental Example 1 except that upper fine patterns of the optical films were as illustrated in FIG. 11

EXPERIMENTAL EXAMPLE 5

Figure 12:
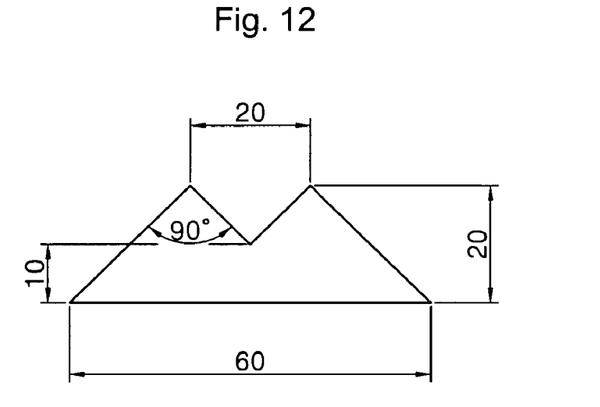

Films stacks were manufactured in the same manner as in Experimental Example 1 except that upper fine patterns of the optical films were as illustrated in FIG. 12.

EXPERIMENTAL EXAMPLE 6

Figure 13:
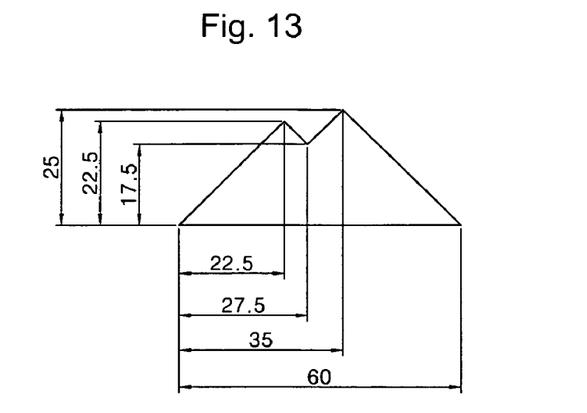

Films stacks were manufactured in the same manner as in Experimental Example 1 except that upper fine patterns of the optical films were as illustrated in FIG. 13.

EXPERIMENTAL EXAMPLE 7

Figure 14:
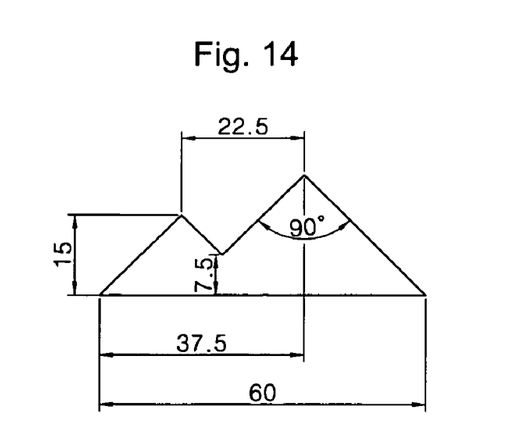

Films stacks were manufactured in the same manner as in Experimental Example 1 except that upper fine patterns of the optical films were as illustrated in FIG. 14.

EXPERIMENTAL EXAMPLE 8

Figure 15:
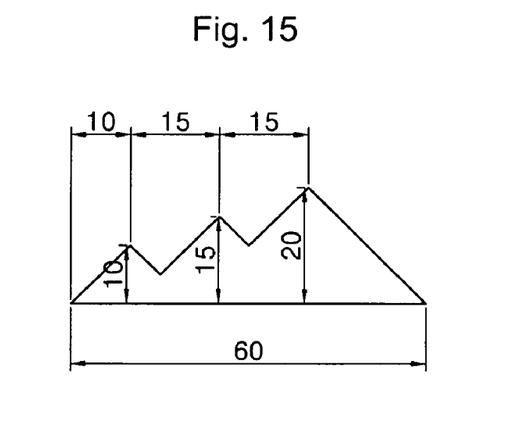

Films stacks were manufactured in the same manner as in Experimental Example 1 except that upper fine patterns of the optical films were as illustrated in FIG. 15.

EXPERIMENTAL EXAMPLE 9

Figure 16:
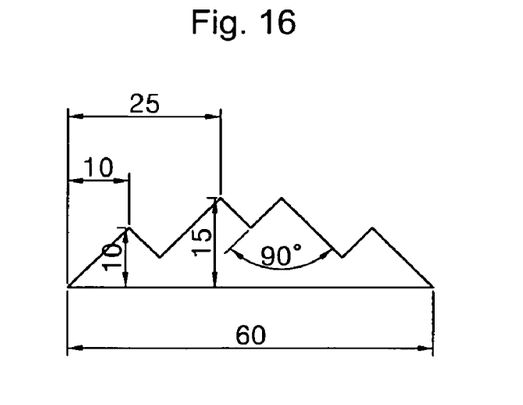

Films stacks were manufactured in the same manner as in Experimental Example 1 except that upper fine patterns of the optical films were as illustrated in FIG. 16.

EXPERIMENTAL EXAMPLE 10

Films stacks were manufactured in the same manner as in Experimental Example 1 except that upper fine patterns of the optical films were as illustrated in FIG. 17.

TABLE 3

| Sample | Front brightness increase | Front brightness relative to Comparative Example 1 | Viewing angle (Vertical) | Viewing angle relative to Comparative Example 1 (Vertical) |
|---|---|---|---|---|
| Comparative Example 1 (FIG. 1) | 1.958 | 100% | 36.88° | ±0° |
| Experimental Example 1 (FIG. 8) | 1.973 | 100.77% | 30.87° | ±6.01° |
| Experimental Example 2 (FIG. 9) | 1.972 | 100.71% | 30.93° | ±5.95° |
| Experimental Example 3 (FIG. 10) | 1.969 | 100.56% | 30.98° | ±5.90° |
| Experimental Example 4 (FIG. 11) | 1.996 | 101.94% | 30.57° | ±6.31° |
| Experimental Example 5 (FIG. 12) | 1.970 | 100.61% | 30.95° | ±5.97° |

TABLE 3-continued

| Sample | Front brightness increase | Front brightness relative to Comparative Example 1 | Viewing angle (Vertical) | Viewing angle relative to Comparative Example 1 (Vertical) |
|---|---|---|---|---|
| Experimental Example 6 (FIG. 13) | 1.973 | 100.77% | 36.84° | ±0.04° |
| Experimental Example 7 (FIG. 14) | 1.984 | 101.32% | 36.67° | ±0.21° |
| Experimental Example 8 (FIG. 15) | 1.990 | 101.64% | 36.64° | ±0.24° |
| Experimental Example 9 (FIG. 16) | 1.999 | 102.09% | 36.34° | ±0.54° |
| Experimental Example 10 (FIG. 17) | 2.009 | 102.60% | 36.27° | ±0.61° |

TABLE 4

| Sample | Front brightness increase | Front brightness relative to Comparative Example 1 | Viewing angle (Horizontal) | Viewing angle relative to Comparative Example 1 (Horizontal) |
|---|---|---|---|---|
| Comparative Example 1 (FIG. 1) | 1.958 | 100% | 54.99° | ±0° |
| Experimental Example 1 (FIG. 8) | 1.973 | 100.77% | ≥70° | ±15.01° |
| Experimental Example 2 (FIG. 9) | 1.972 | 100.71% | ≥70° | ±15.01° |
| Experimental Example 3 (FIG. 10) | 1.969 | 100.56% | ≥70° | ±15.01° |
| Experimental Example 4 (FIG. 11) | 1.996 | 101.94% | ≥70° | ±15.01° |
| Experimental Example 5 (FIG. 12) | 1.970 | 100.61% | ≥70° | ±15.01° |
| Experimental Example 6 (FIG. 13) | 1.973 | 100.77% | 54.74° | ±0.25° |
| Experimental Example 7 (FIG. 14) | 1.984 | 101.32% | 54.62° | ±0.37° |
| Experimental Example 8 (FIG. 15) | 1.990 | 101.64% | 54.61° | ±0.38° |
| Experimental Example 9 (FIG. 16) | 1.999 | 102.09% | 53.66° | ±1.33° |
| Experimental Example 10 (FIG. 17) | 2.009 | 102.60% | 53.51° | ±1.38° |

As seen from Tables 3 and 4, when an optical film according to the present invention is used as a prism sheet, front brightness is remarkably improved, and a horizontal viewing angle can be enhanced by about 20 degrees or more with no change in a vertical viewing angle.

An optical film according to the present invention can remarkably improve a front brightness and a horizontal viewing angle by optimizing a pattern shape. Such an optical film can be applied to a direct-type or an edge-type surface light source device, and thus, can be efficiently used in various transmissive display apparatuses.

An optical film according to the present invention and a surface light source device and a liquid crystal display employing the same provide the following advantages: (1) good optical characteristics, heat resistance, UV-shielding property, and thermosetting/photo-curing properties, and easy and precise adjustment of refractive index; (2) the preparation of a silicone resin having a less carbon content so that light loss does not occur when light from a light source passes through the optical film; (3) an increase in front brightness and visibility from slanted sides with no reduction or improvement in a viewing angle due to the silicone resin; (4) uniform brightness on screens, uniform display, prevention of appearance of wavy patterns due to a relationship between liquid crystal cells and surface light sources, and enhancement in display quality; (5) stable maintenance of display quality for a long time; (6) effective protection of constitutional elements from UV light leaked from a light source without using a UV absorber; and (7) easy film formation and processing, and thus, enhancement in production efficiency.

What is claimed is:

1. A multifunctional optical film comprising:
   a transparent substrate;
   a light-focusing layer and a light-diffusing layer,
   wherein the light-focusing layer is disposed on a surface of the transparent substrate, and the light-diffusing layer is disposed on another surface of the transparent substrate, wherein the light-focusing layer comprises at least one selected from the group consisting of high refractive silicone resins as represented by Formula 1 below, and wherein the light-diffusing layer comprises at least one selected from the group consisting of low refractive silicone resins as represented by Formula 2 below:

<Formula 1>

<Formula 2> wherein, $R_1, R_2, R_3, R_4$, and $R_5$ are each independently hydrogen, a substituted or unsubstituted C1-C30 aliphatic hydrocarbon, a substituted or unsubstituted C1-C30 aromatic hydrocarbon, a substituted or unsubstituted C1-C30 silyl group, a substituted or unsubstituted C1-C30 allyl group, a substituted or unsubstituted C1-C30 acyl group, an amine group, a halogen atom, a hydroxy group, a carboxyl group, a nitro group, or an alkaline metal; M is silicon, aluminum, titanium, or zirconium; and $n_1$, $n_2$, $m_1$, and $m_2$ are each independently an integer of 2 to 300,000.

2. The multifunctional optical film of claim 1, wherein the light-focusing layer comprises an array of a plurality of spheres, lenses, or linear triangular prisms.

3. The multifunctional optical film of claim 2, wherein at least one groove is formed in each of the prisms.

4. The multifunctional optical film of claim 3, wherein the at least one groove has a stepped structure.

5. The multifunctional optical film of claim 2, wherein each of the prisms is truncated.

6. The multifunctional optical film of claim 2, wherein the prisms are separated from each other by a distance of 0.1 to 5 μm.

7. The multifunctional optical film of claim 2, wherein the prisms have a wavy structure in the lengthwise direction of the prisms.

8. A surface light source device illuminating a rear surface of a transmissive display unit and comprising: a light source unit comprising an array of a plurality of light sources; and the multifunctional optical film of claim 1 on which light from the light sources of the light source unit is incident.

9. A liquid crystal display comprising: a transmissive display unit; and a surface light source device illuminating a rear surface of the transmissive display unit, wherein the surface light source device comprises the multifunctional optical film of claim 1.

* * * * *